June 29, 1943.　　　G. F. PEMBROKE　　　2,322,954
GAUGING APPARATUS
Filed March 26, 1942　　　3 Sheets-Sheet 3

Inventor
George F. Pembroke
By
Watson, Cole, Grindle & Watson

Patented June 29, 1943

2,322,954

UNITED STATES PATENT OFFICE 2,322,954

GAUGING APPARATUS

George Frederick Pembroke, Deptford, London, England, assignor to Molins Machine Company Limited, Deptford, London, England Application March 26, 1942, Serial No. 436,368
In Great Britain March 18, 1941

3 Claims. (Cl. 33—174)

This invention concerns improvements in or relating to gauging, sorting or grading apparatus and has particular reference to apparatus for gauging articles having tapers.

In a machine for gauging or testing the sizes of various parts of cartridge-cases, it is customary to feed the cartridge-cases to each of a succession of stages at each of which a different gauging or testing operation is performed. The cases are usually conveyed transversely to their lengths and are supported at each station while the gauging operation is performed. When gauging the positions of the tapering shoulders of cartridge cases from their bases, it is a practice to move the cartridge case endwise into a taper ring gauge. This necessitates moving the cartridge-case or the gauge a considerable distance since the gauge must pass over the narrow neck portion of the case before the gauge can engage the shoulder. By the present invention this relative endwise movement between the gauge and the case is reduced to a minimum by splitting the gauge and causing the separated portions to move apart sufficiently to allow a cartridge case to be moved transversely to its length between said separated portions of the gauge. When the cartridge case is brought to rest at the station, the portions of the gauge are closed down and only a small endwise movement in the neighbourhood of 1 mm. or 2 mm. is necessary.

According to the invention there is provided apparatus for gauging articles having a taper thereon, comprising in combination, an external taper gauge consisting of separate opposed portions between which the article to be gauged is placed and which are movable relatively to each other for the purpose of permitting an article to be fed into and subsequently removed from between said portions, means to set or adjust the gauge prior to a gauging operation, and a movable presser-element to engage the larger end of the article and to apply a pressure thereon and indicator-mechanism operably coupled to said presser-element and adapted to be actuated according to the position finally taken up by the presser-element in a gauging operation.

One embodiment of the invention will now be described by way of example with reference to the accompanying drawings which show part of a machine for gauging cartridge-cases.

In the drawings—

Figure 1:
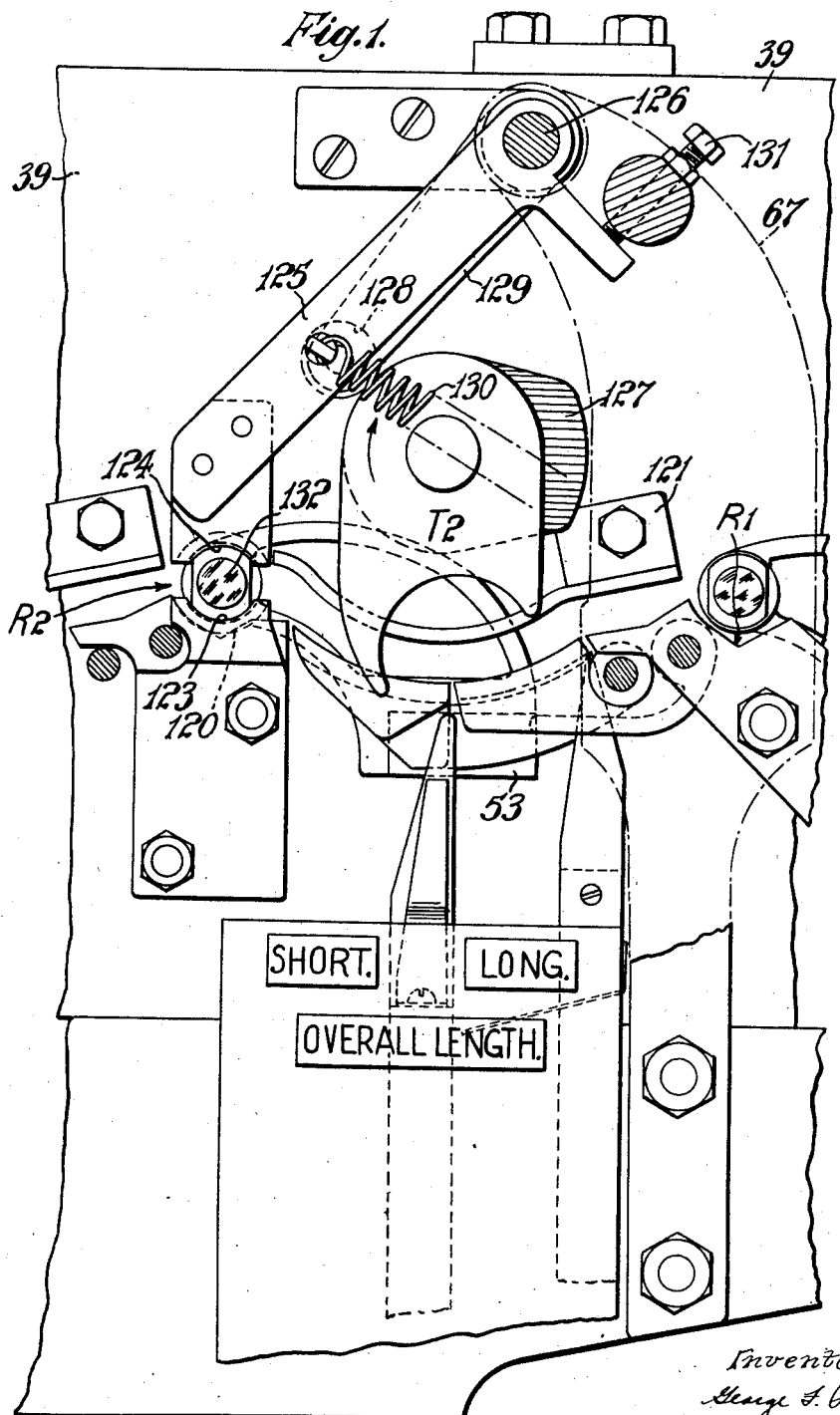
Figure 1 is a front elevation of the part of the machine which is adapted to gauge the position of the tapering shoulders of cartridge cases relatively to their bases.

The machine is described and illustrated in detail in the specification of co-pending United States patent application, Felix F. Ruau, Serial No. 399,561, filed June 24, 1941, and the accompanying drawings are fragments of those shown in said specification suitably modified to illustrate the features of the present invention.

Referring to the drawings the cartridge-cases 30 which, for convenience, are hereinafter referred to as "cases," are fed in succession to a receptacle R2 comprising V shaped supports 120. Each case has already been subjected to a gauging operation in a receptacle R1 and the mechanism for feeding the cases to the receptacle R2 comprises a transfer member T2 also shown in the specification referred to and fully described in the complete specification accompanying co-pending United States patent application No. 434,127.

Figure 2:
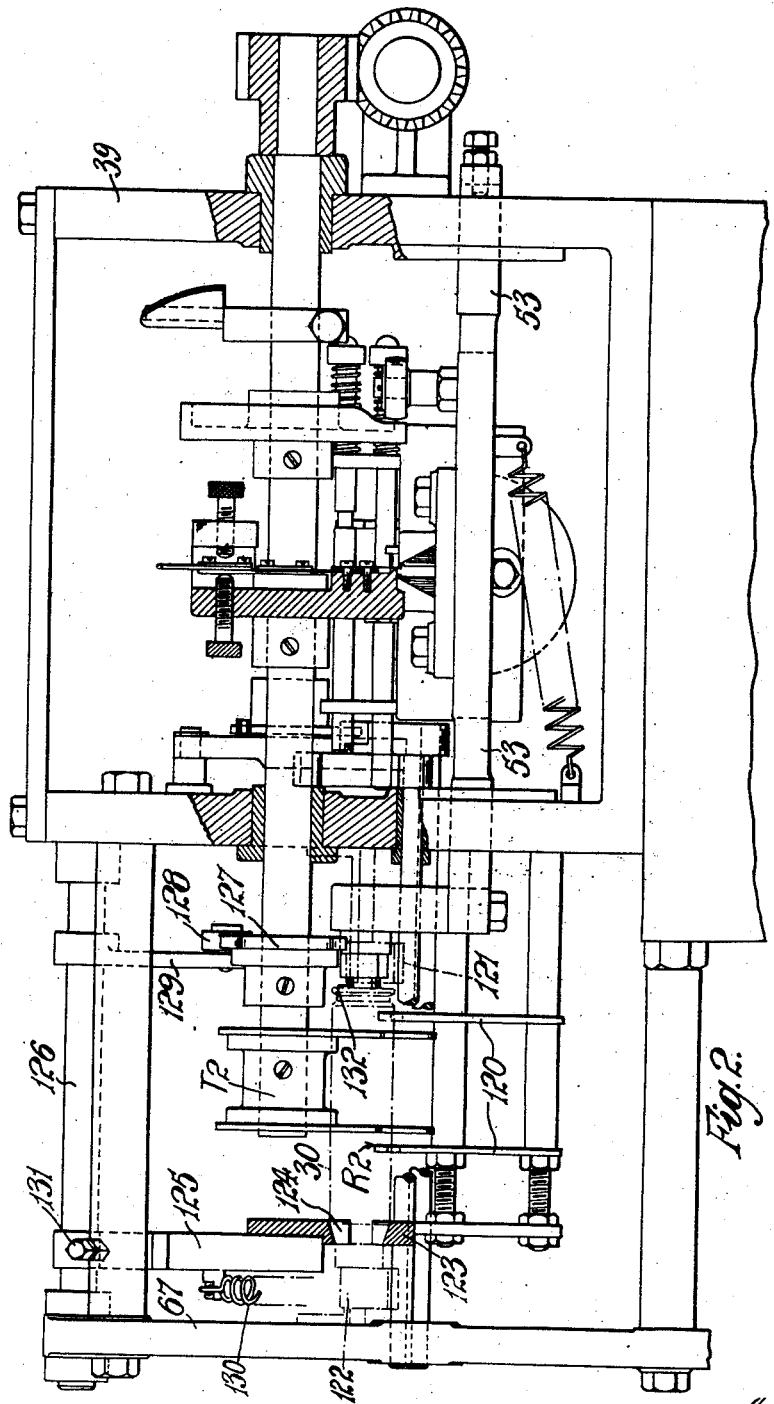
Figure 2 is a side elevation of Figure 1 partly in section, some parts being omitted.
Figure 3:
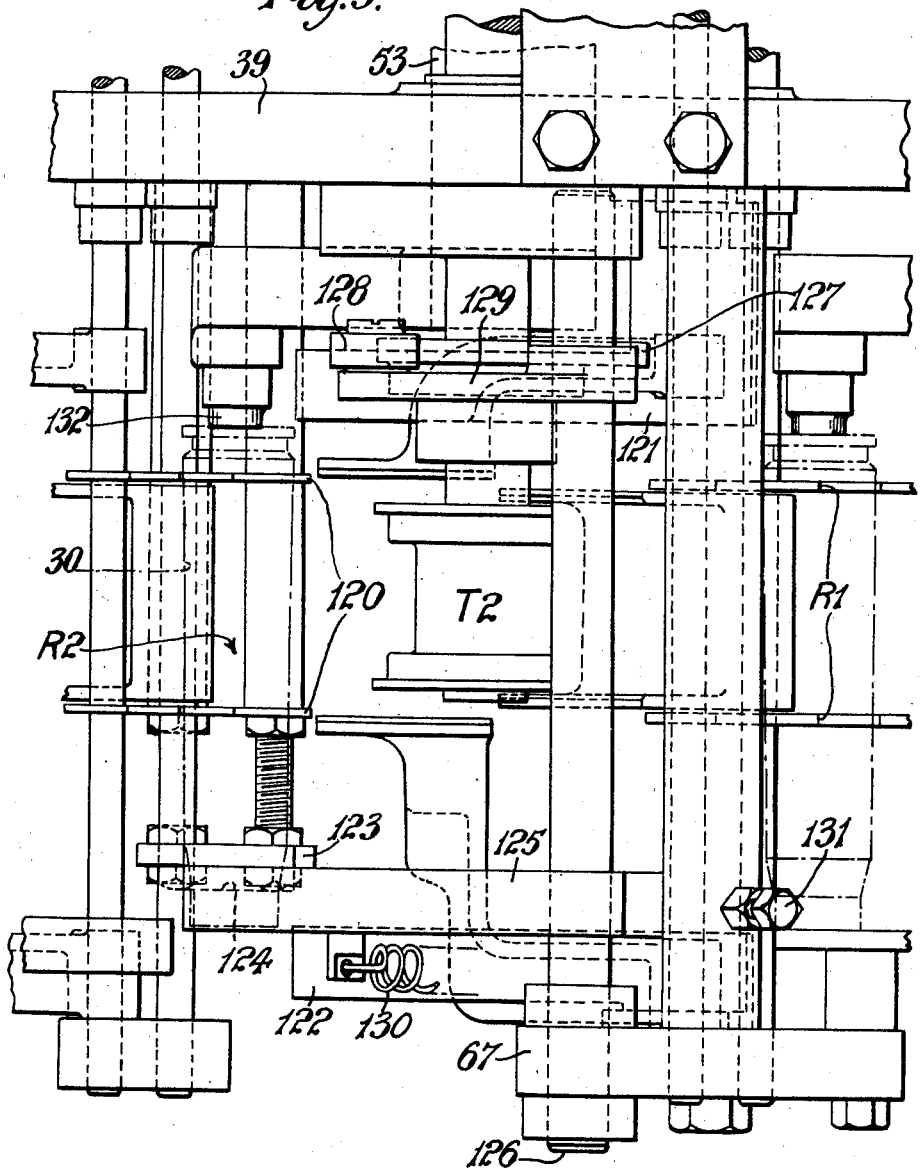
Figure 3 is a plan of Figure 1.

As the cases are moved towards and on to the V shaped supports 120, the bases of the cases are engaged by a guide 121 and the open ends by a guide 122, these guides being arranged to ensure that a case is in the desired position when it is resting on the V shaped supports. The guide 122 is omitted from Figure 1 and both guides are shown in chain lines in Figure 2 to avoid obscuring other parts.

The gauge for gauging the taper of the shoulders of the cases comprises an external or ring gauge which is formed in two opposed parts 123 and 124. The lower part 123 is fixed to the frame 39 of the machine while the upper part 124 is carried on a lever 125 which is fixed on a spindle 126 pivotally mounted in the frame 39 and a bracket 67. A cam 127 is arranged to move the lever up and down about the axis of the spindle by engaging a roller 128 mounted on the end of a lever 129 also fixed to the spindle 126, the return movement being by a spring 130. The lever is moved downwardly prior to a gauging operation and the extent of downward movement of the lever is determined by an adjustable stop 131. Before the machine commences to operate, the adjustable stop is set and locked in position according to the degree of taper which it is desired that the shoulder of a cartridge shall have.

When the lever has been moved downwardly, a case which is located on the V shaped supports is engaged by inserter-means which comprises a pusher 132 and is moved lengthwise into the ring-gauge. The pusher engages the closed end of the case, which end is the larger end, so that the smaller end of the case is moved into the gauge. The pusher continues to move the case lengthwise until it is arrested by the gauge fitting around the shoulder of the case. The pusher is connected with indicator-mechanism by being attached to a sliding bar 53 on which is supported a magnet. This indicator-mechanism, which includes indicator members, is fully described and illustrated in United States patent application Serial No. 399,561 and is sufficiently illustrated herein in Figure 2 for identification. According to the extent of movement of the pusher the magnet on the slidable bar will set one or other of the indicator-members should the position of the taper on the shoulder of a case relatively to the base thereof be found not to be within the desired limits.

When a testing operation is completed, the cam 127 again causes the lever 125 to be lifted, thus permitting the transfer-member T2 to move the tested case away from the V shaped supports without the necessity of the case being moved lengthwise out of engagement with the gauge.

What I claim as my invention and desire to secure by Letters Patent is:

1. Apparatus for gauging articles which have external tapering surfaces comprising separable members having concave tapering seating surfaces adapted to engage the convex tapering surface of an interposed article, means for moving said members relatively to each other to permit an article to be gauged to be placed therebetween prior to, and removed after, gauging, and to cause said members to assume predetermined gauging relationship to each other, and an element for exerting pressure upon an article, when said members are in gauging relationship to cause the tapered portion thereof to closely engage the tapering seating surfaces of said members, said element being adapted to be connected to a suitable mechanism for indicating the extent of its movement.

2. The combination set forth in claim 1 in which said element is mounted for movement along the common axis of the tapered surfaces of said members, when said members are in gauging position, whereby said element will engage, when it is operated, the end of an article to be gauged.

3. The combination set forth in claim 1 in which said means includes a device for establishing the gauge by precisely limiting the extent of relative movement of said members toward each other.

GEORGE FREDERICK PEMBROKE.